United States Patent
Miller et al.

(10) Patent No.: US 11,804,210 B2
(45) Date of Patent: Oct. 31, 2023

(54) GRAPHICS TRANSLATION TO NATURAL LANGUAGE BASED ON SYSTEM LEARNED GRAPHICS DESCRIPTIONS

(71) Applicant: Toshiba Global Commerce Solutions Holdings Corporation, Tokyo (JP)

(72) Inventors: Manda Miller, Raleigh, NC (US); Kirk Goldman, Cary, NC (US); Jon A. Hoffman, Cary, NC (US); John Pistone, Cary, NC (US); Dimple Nanwani, Durham, NC (US); Theodore Clark, Allendale, NJ (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 17/386,328

(22) Filed: Jul. 27, 2021

(65) Prior Publication Data
US 2023/0037100 A1    Feb. 2, 2023

(51) Int. Cl.
| | | |
|---|---|---|
| *G10L 13/027* | (2013.01) | |
| *G06T 11/00* | (2006.01) | |
| *G06N 5/04* | (2023.01) | |
| *G06Q 10/10* | (2023.01) | |
| *G06F 21/44* | (2013.01) | |
| *G06V 10/10* | (2022.01) | |
| *G06F 18/2415* | (2023.01) | |
| *G06Q 30/0601* | (2023.01) | |
| *G06Q 10/101* | (2023.01) | |

(52) U.S. Cl.
CPC ........ *G10L 13/027* (2013.01); *G06F 18/2415* (2023.01); *G06F 21/44* (2013.01); *G06Q 10/101* (2013.01); *G06Q 30/0631* (2013.01); *G06T 11/00* (2013.01); *G06V 10/10* (2022.01)

(58) Field of Classification Search
CPC ........ G06T 11/00; G06N 5/04; G06Q 10/101; G06Q 30/0631; G06F 21/44; G06F 18/2415; G06V 10/10
USPC ................... 348/222.1; 706/45, 23; 705/26.7
See application file for complete search history.

(56) References Cited

U.S. PATENT DOCUMENTS

| | | |
|---|---|---|
| 6,606,611 B1 | 8/2003 | Khan |
| 8,335,723 B2 | 12/2012 | Tedesco et al. |

(Continued)

OTHER PUBLICATIONS

Christi Olson, "How to make your content more accessible to the visually impaired," Martech, dated Jan. 18, 2019.

(Continued)

*Primary Examiner* — Farzad Kazeminezhad
(74) *Attorney, Agent, or Firm* — Patterson + Sheridan, LLP

(57) ABSTRACT

The present disclosure provides techniques for graphics translation. A plurality of natural language image descriptions is collected for an image of a product. An overall description for the image is generated using one or more models, based on the plurality of natural language image descriptions, by: identifying a set of shared descriptors used in at least a subset of the plurality of natural language image descriptions, and aggregating the set of shared descriptors to form the overall description. A first request to provide a description of the first image is received, and the overall description is returned in response to the first request, where the overall description is output using one or more text-to-speech techniques.

20 Claims, 7 Drawing Sheets

(56) References Cited

U.S. PATENT DOCUMENTS

| | | | | |
|---|---|---|---|---|
| 8,868,471 | B1* | 10/2014 | Hullender | G06Q 10/101 |
| | | | | 706/23 |
| 10,540,551 | B2* | 1/2020 | Srivastava | G06V 10/10 |
| 2005/0157175 | A1* | 7/2005 | Takamatsu | G06T 11/00 |
| | | | | 348/222.1 |
| 2007/0136222 | A1* | 6/2007 | Horvitz | G06N 5/04 |
| | | | | 706/45 |
| 2015/0046281 | A1* | 2/2015 | Shivaswamy | G06Q 30/0631 |
| | | | | 705/26.7 |
| 2020/0151521 | A1* | 5/2020 | Almazán | G06F 18/2415 |
| 2021/0117071 | A1* | 4/2021 | Gharpuray | G06F 9/547 |
| 2021/0248653 | A1* | 8/2021 | McKenzie | G06F 21/44 |
| 2021/0326403 | A1* | 10/2021 | Berk | G06F 16/972 |

OTHER PUBLICATIONS

Carly Findlay, "What's the image descriptions on my social media posts?" Dated May 14, 2018.

Mike Ashenfelder, "Adding Descriptions to Digital Photos," The Signal, dated Oct. 28, 2011.

\* cited by examiner

GRAPHICS TRANSLATION TO NATURAL LANGUAGE BASED ON SYSTEM LEARNED GRAPHICS DESCRIPTIONS

BACKGROUND

The present disclosure relates to image translation, and more specifically, to translating images to natural language.

As voice-recognition devices and smart assistants are becoming more popular, the available utilities and potential uses has similarly expanded. For example, users may use verbal instructions to receive information (such as the current weather) and perform utility actions (such as controlling intelligent lights) via smart assistant devices in their homes. Existing systems and devices are often limited to audio output (which can include verbal natural language as well as music or other audio effects).

The usefulness of such existing devices and systems is therefore limited when visual output is involved. For example, when asked to describe an image, existing systems may be unable to respond, or may only output information that is specifically and manually authored (e.g., stored in metadata) for the image, such as a brief title or label. The true content of the underlying image is generally lost, and cannot be output by existing smart devices.

Though some devices incorporate screens or displays for visual output, such devices typically involve additional monetary, computational, and power expense, and are often less convenient for users, as compared to audio-only devices. Further, a significant number of users suffer from vision impairment, forcing extensive reliance on screen-readers or audio output (e.g., via text-to-speech algorithms). As above, such screen-readers cannot generally read or describe pictures or other graphics, relying instead on simple metadata labels that must be manually authored and curated for each image.

Accordingly, improved systems and techniques for image translation are needed.

SUMMARY

According to one embodiment of the present disclosure, a method is provided. The method includes collecting, for a first image of a first product, a plurality of natural language image descriptions; generating an overall description for the first image using one or more models, based on the plurality of natural language image descriptions, comprising: identifying a set of shared descriptors used in at least a subset of the plurality of natural language image descriptions; and aggregating the set of shared descriptors to form the overall description; receiving a first request to provide a description of the first image; and returning the overall description in response to the first request, wherein the overall description is output using one or more text-to-speech techniques.

According to a second embodiment of the present disclosure, a computer-readable storage medium is provided. The computer-readable storage medium contains computer program code that, when executed by operation of one or more computer processors, performs an operation. The operation includes collecting, for a first image of a first product, a plurality of natural language image descriptions; generating an overall description for the first image using one or more models, based on the plurality of natural language image descriptions, comprising: identifying a set of shared descriptors used in at least a subset of the plurality of natural language image descriptions; and aggregating the set of shared descriptors to form the overall description; receiving a first request to provide a description of the first image; and returning the overall description in response to the first request, wherein the overall description is output using one or more text-to-speech techniques.

According to a third embodiment of the present disclosure, a system is provided. The system includes one or more computer processors, and a memory containing a program which, when executed by the one or more computer processors, performs an operation. The operation includes collecting, for a first image of a first product, a plurality of natural language image descriptions; generating an overall description for the first image using one or more models, based on the plurality of natural language image descriptions, comprising: identifying a set of shared descriptors used in at least a subset of the plurality of natural language image descriptions; and aggregating the set of shared descriptors to form the overall description; receiving a first request to provide a description of the first image; and returning the overall description in response to the first request, wherein the overall description is output using one or more text-to-speech techniques.

DETAILED DESCRIPTION

Figure 1:
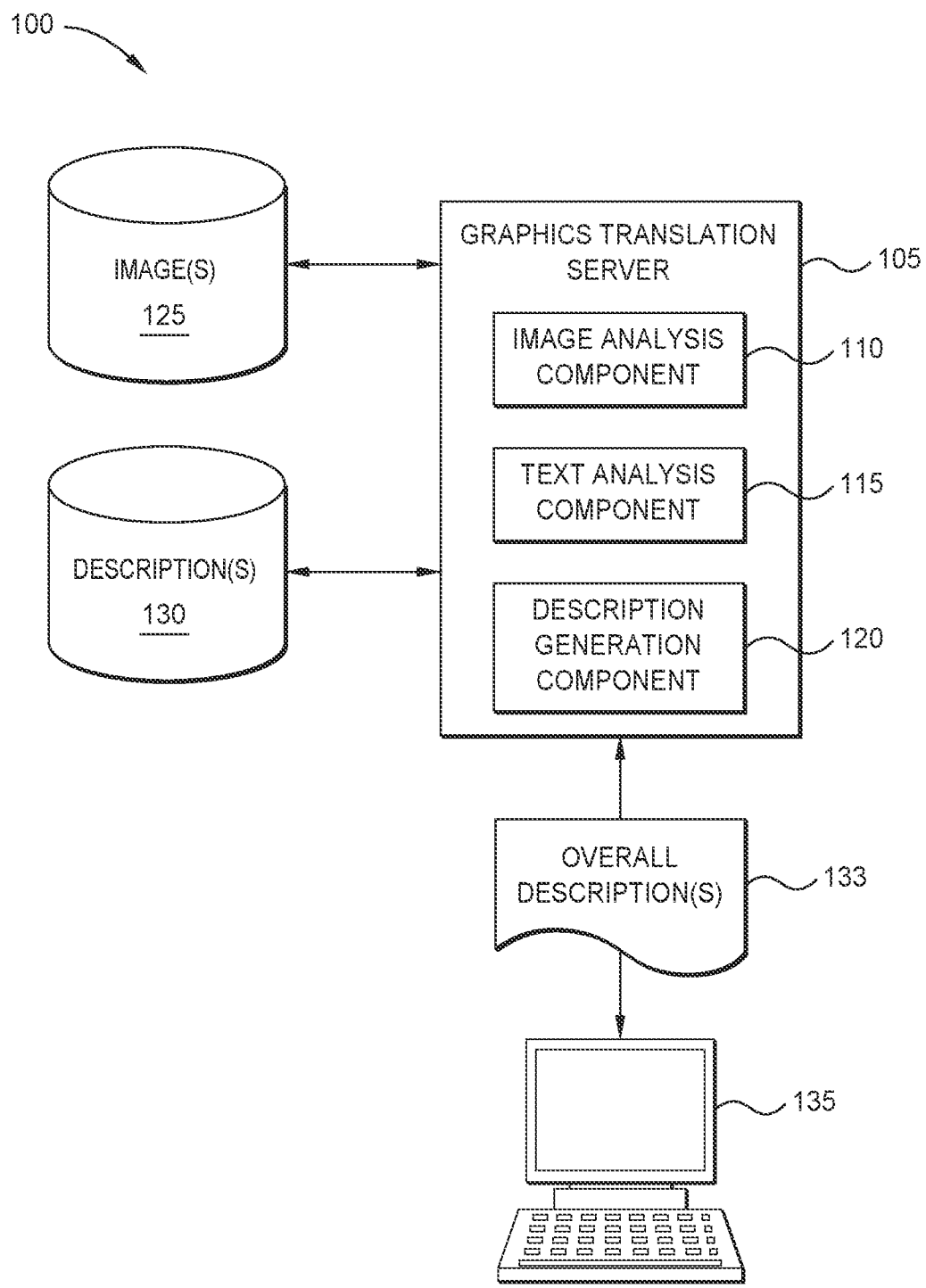
FIG. 1 illustrates an environment for graphic translation via image analysis, according to one embodiment disclosed herein.

Embodiments of the present disclosure provide techniques to generate natural language descriptions for images.

In existing systems, it is generally difficult or impossible to extract detailed information about images or graphics. For example, in an e-commerce setting, images of products (e.g., clothing) are often accompanied by a generic product description. However, these descriptions are often limited in scope and use language that may not truly describe the product. Relying exclusively on such manually-curated descriptions (without viewing the accompanying image(s)) can significantly impair the user's ability to understand what the product looks like. Further, such existing descriptions do not readily enable to user to infer how products (e.g., clothing) would look on themselves. Though e-commerce imagery is used in some examples discussed herein, embodiments of the present disclosure are readily applicable to a wide variety of image translation tasks.

In some embodiments, one or more machine learning algorithms or models can be developed to allow graphics or images (e.g., from an online retailer) to be translated into relevant natural language descriptions. In at least one embodiment, uploaded images can be described by one or more human users (e.g., using a form that includes a set of descriptors, in product reviews, or in a description provided by the retailer or manufacturer). These textual descriptions, along with the image, can then be evaluated via an algorithm that finds commonalities within them and generates natural language output that can be used to describe the image. In some embodiments, the system can learn over time to generate its own descriptions with limited (or no) human input.

In various embodiments, the descriptions can include a variety of descriptors depending on the particular implementation. For example, in a retail setting, the system may include descriptors such as the color(s) of the depicted product, how it fits (e.g., the neckline, waist, sleeve and/or pant length, and the like), descriptions of the model (including human models, mannequins, and virtual models) wearing or using the product, such as their height, weight, body type (which may allow users to gauge whether the product would work well for them), the texture or material of the product, and the like. In some embodiments, items that are worn by users (e.g., pants, shirts, shoes, accessories, dresses, and the like) are used as example products. However, embodiments of the present disclosure are readily applicable to a wide variety of products.

Advantageously, these natural language descriptions can be output using audio devices (e.g., via one or more text-to-speech techniques), allowing the images to be effectively and automatically translated to a rich and detailed verbal description. Accordingly, the techniques described herein can improve a variety of systems and devices by enabling significantly more functionality and interactivity via textual or verbal descriptions of graphical images. This can be particularly useful in expanding the capabilities of devices with otherwise-limited capability, such as audio-only output. Similarly, aspects of the present disclosure can enable various computing devices (such as smart assistant devices) to interface more effectively with visually-impaired users who may otherwise be unable to view the image or otherwise understand its content.

FIG. 1 illustrates an environment 100 for graphic translation via image analysis, according to one embodiment disclosed herein. In the illustrated environment 100, a Graphics Translation Server 105 is communicatively coupled with a store of Images 125 and corresponding Descriptions 130, as well as one or more User Devices 135. Although depicted as discrete components for conceptual clarity, in aspects, the Images 125 and Descriptions 130 may be maintained in any suitable location, including within the Graphics Translation Server 105. Further, although a single User Device 135 is depicted, there may of course be any number and variety of user devices in various embodiments.

In the illustrated example, the User Device 135 is a computer. In various aspects, the User Device 135 can generally include any computing device capable of providing output to a user, such as a desktop, laptop, smartphone, assistant device, and the like. In some embodiments, the User Device 135 is configured to output audio (either exclusively, or alongside visual output). For example, the User Device 135 may be a smart assistant device that is configured to receive verbal input (e.g., instructions or requests from user(s)) and output audio or verbal output (e.g., via text-to-speech algorithms).

The Images 125 can generally depict any entities, actions, and/or objects, depending on the particular implementation. For example, in one embodiment, the Images 125 are product images (which may include models using or wearing the products, as well as the products themselves) used in a retail environment. In embodiments, the retail environment may include a wide variety of environments, such as an e-commerce website, a physical storefront, an application with product images (which may or may not have the capability to actually sell the products), and the like. The Images 125 may include photographs, computer-generated depictions, or a combination. In some embodiments, the Images 125 may also include video data (e.g., as a sequence of images).

Generally, the Descriptions 130 are natural-language textual descriptions of the Images 125, and/or of the product(s) or other objects depicted in the Images 125. In some aspects, each Description 130 is associated with a corresponding one or more Image(s) 125. For example, an Image 125 depicting a model wearing a shirt that may be purchased can be associated with one or more Descriptions 130 that describe the shirt, the model, the context of the Image 125, and the like.

In some embodiments, the Descriptions 130 are provided by human users. For example, some of the Descriptions 130 may be authored and/or provided by the provider of the depicted product (e.g., the manufacturer or the retailer). Similarly, some of the Descriptions 130 may be provided by consumers (e.g., in reviews or other descriptions of the products). In at least one embodiment, forms requesting input on various descriptors can be provided to users. The users may view the Image(s) 125 and provide information on the requested descriptor(s) in order to generate the Descriptions 130.

In the illustrated example, a Graphics Translation Server 105 can evaluate the Image(s) 125 and Description(s) 130 to generate Overall Descriptions 133. The Overall Descriptions 133 generally include natural language descriptions of one or more Image(s) 125 (or of the associated product, person, action, or object depicted). For example, the User Device 135 may request a description for a given Image 125 (e.g., on a retail website), and the Graphics Translation Server 105 may generate an Overall Description 133 that describes the content of the Image 125. The User Device 135 and/or Graphics Translation Server 105 can use this natural language description to generate verbal output (e.g., via text-to-speech algorithms).

As illustrated, the Graphics Translation Server 105 includes an Image Analysis Component 110, Text Analysis Component 115, and Description Generation Component 120. Although depicted as discrete components for conceptual clarity, the operations of Image Analysis Component 110, Text Analysis Component 115, and Description Generation Component 120 may be combined or distributed across any number of components. Further, the Image Analysis Component 110, Text Analysis Component 115, and Description Generation Component 120 may be implemented using hardware, software, or a combination of hardware and software.

Generally, the Text Analysis Component 115 can evaluate and analyze a set of relevant Descriptions 130. That is, for a given Image 125, the Text Analysis Component 115 can retrieve and analyze the corresponding set of Descriptions 130 that describe the Image 125. In some embodiments, this analysis includes identifying common or shared descriptors in the Descriptions 130. For example, the Text Analysis Component 115 may identify terms, phrases, or other descriptors that are used in multiple Descriptions 130 for the Image 125. In various embodiments, this may include identifying descriptors included in a threshold number or percentage of the relevant set of Descriptions 130. In some aspects, the Text Analysis Component 115 can identify synonymous or related descriptors as well. For example, the Text Analysis Component 115 may determine that "pale blue" and "light blue" descriptors are roughly synonymous (e.g., using a predefined dictionary).

For example, suppose one Description 130 states "the dress is a bright red, with a deep neckline. It falls just above the model's knees." while another Description 130 states "love how red this dress is! The neckline is a bit low, but the length is good and lands right at the knee." In one aspect, the Text Analysis Component 115 may identify "red" as a shared color descriptor, as well as "low" or "deep" neckline as a shared fit descriptor. Similarly, the Text Analysis Component 115 may identify "knee-length" as a shared fit descriptor.

In some embodiments, if contradictory descriptors are found (e.g., some Descriptions 130 describe it as "red" while others describe it as "green"), the Text Analysis Component 115 may take a variety of actions, including identifying which descriptor is found in more Descriptions 130, requesting manual input from a user, and the like.

In some aspects, once the set of shared descriptors are identified, the Description Generation Component 120 can use them to generate an Overall Description 133 for the Image 125. Continuing the above example, the Description Generation Component 120 may generate an Overall Description 133 that includes "this dress is red. It has a low/deep neckline, and is roughly knee-length." Thus, in some aspects, the Overall Descriptions 133 are generated by aggregating information from the associated Descriptions 130.

In at least one embodiment, the Graphics Translation Server 105 may use the Descriptions 130, shared descriptors, and/or Overall Descriptions 133 to train one or more machine learning models. For example, the Image Analysis Component 110 may be trained by providing an Image 125 as input, with the corresponding Descriptions 130, shared descriptors, and/or Overall Descriptions 133 used as target output from the model. In this way, the Image Analysis Component 110 can be iteratively refined to generate textual descriptions (e.g., shared descriptors or Overall Descriptions 133) when given input Images 125.

In a related embodiment, the Graphics Translation Server 105 may train a machine learning model by using the Descriptions 130 as input to the model, and the shared descriptors and/or Overall Descriptions 133 as target output. In this way, the model be iteratively refined to generate textual descriptions (e.g., shared descriptors or Overall Descriptions 133) when given input Descriptions 130.

In some embodiments, the Graphics Translation Server 105 can similarly learn over time to include shared descriptors between different images or products. For example, suppose a given retailer described the color of a product as "sunset," and the Text Analysis Component 115 determines that "orange" is a shared descriptor in user-provided reviews. In one such embodiment, if the Graphics Translation Server 105 later determines that the retailer has labeled another product as "sunset," the Graphics Translation Server 105 can determine that "orange" should be included in the Overall Description 133 without analyzing any Descriptions 130 of the new image. In a related embodiment, the Graphics Translation Server 105 may determine that the same model is depicted in both Images 125 (e.g., based on metadata associated with each). Based on this determination, the Graphics Translation Server 105 can identify descriptors of the model for the first image, and use these descriptors in the Overall Description 133 of the second.

In at least one embodiment, the models or algorithms used by the Graphics Translation Server 105 are specific to the individual retailer, manufacturer, or other entity. For example, when searching for shared or overlapping descriptions (such as "sunset"), the Graphics Translation Server 105 may only consider other images from the same retailer/manufacturer.

Figure 2:
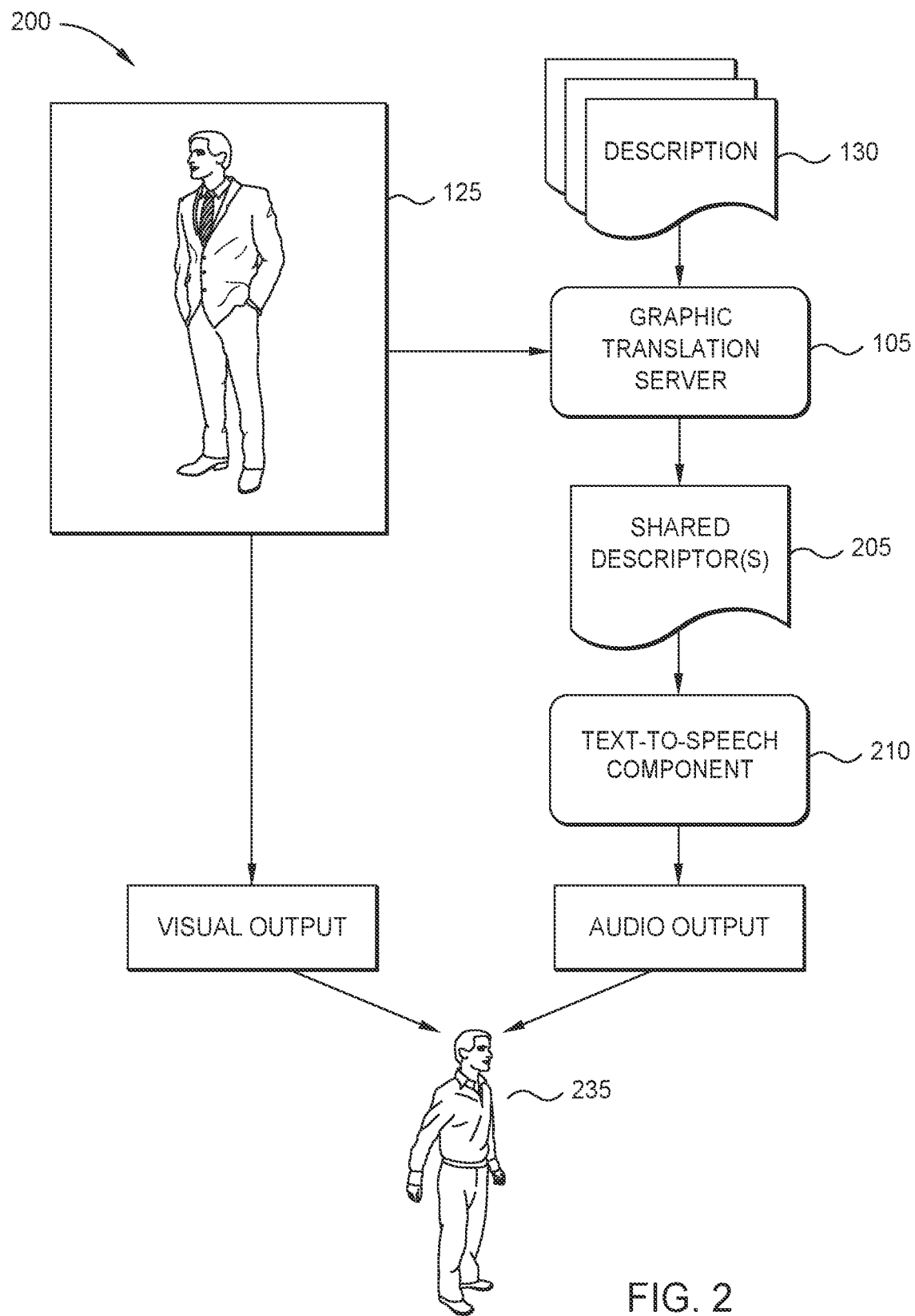
FIG. 2 is a flow diagram illustrating a workflow for image translation to natural language speech output, according to one embodiment disclosed herein.

FIG. 2 is a flow diagram illustrating a workflow 200 for image translation to natural language speech output, according to one embodiment disclosed herein. In the illustrated workflow 200, an Image 125 of a model wearing a dress is associated with a set of textual Descriptions 130. These Descriptions 130 may include, for example, user reviews, completed forms indicating various descriptors, and the like.

As illustrated, the Descriptions 130 are provided to a Graphics Translation Server 105, which identifies a set of Shared Descriptors 205, as discussed above. In some aspects, in addition to or instead of outputting the Shared Descriptors 205 directly, the Graphics Translation Server 105 may use them to generate a natural language Overall Description 133, as discussed above.

For example, the Graphics Translation Server 105 may determine that the Shared Descriptors 205 include a color of the dress, as well as descriptions relating to the fit of the dress, the texture or material, the characteristics of the model, and the like.

As illustrated, the Image 125 may also be provided to the Graphics Translation Server 105. In at least one embodiment, the Graphics Translation Server 105 can train or refine one or more machine learning models based on the Image 125 and accompanying Descriptions 130, as discussed above. Further, in some embodiments, the Graphics Translation Server 105 may generate and output Shared Descriptors 205 and/or an overall description by processing the Image 125 using the trained machine learning model(s), as discussed above. That is, the Graphics Translation Server 105 may be configured to output Shared Descriptors 205 and/or overall descriptions without analyzing the Descriptions 130.

In the illustrated example, the Shared Descriptors 205 (and/or the overall description) are provided to a Text-To-Speech Component 210, which generates Audio Output 230 for the User 235. For example, the Audio Output 230 may correspond to a natural language description of the Image 125 and/or the dress, provided via one or more speakers. In some embodiments, if a visual output device is available, the Image 125 may itself be provided as Visual Output 215 as well via a screen or display. For example, if the user device is configured to output images, the system may provide the Image 125 while outputting the Audio Output 230.

Figure 3:
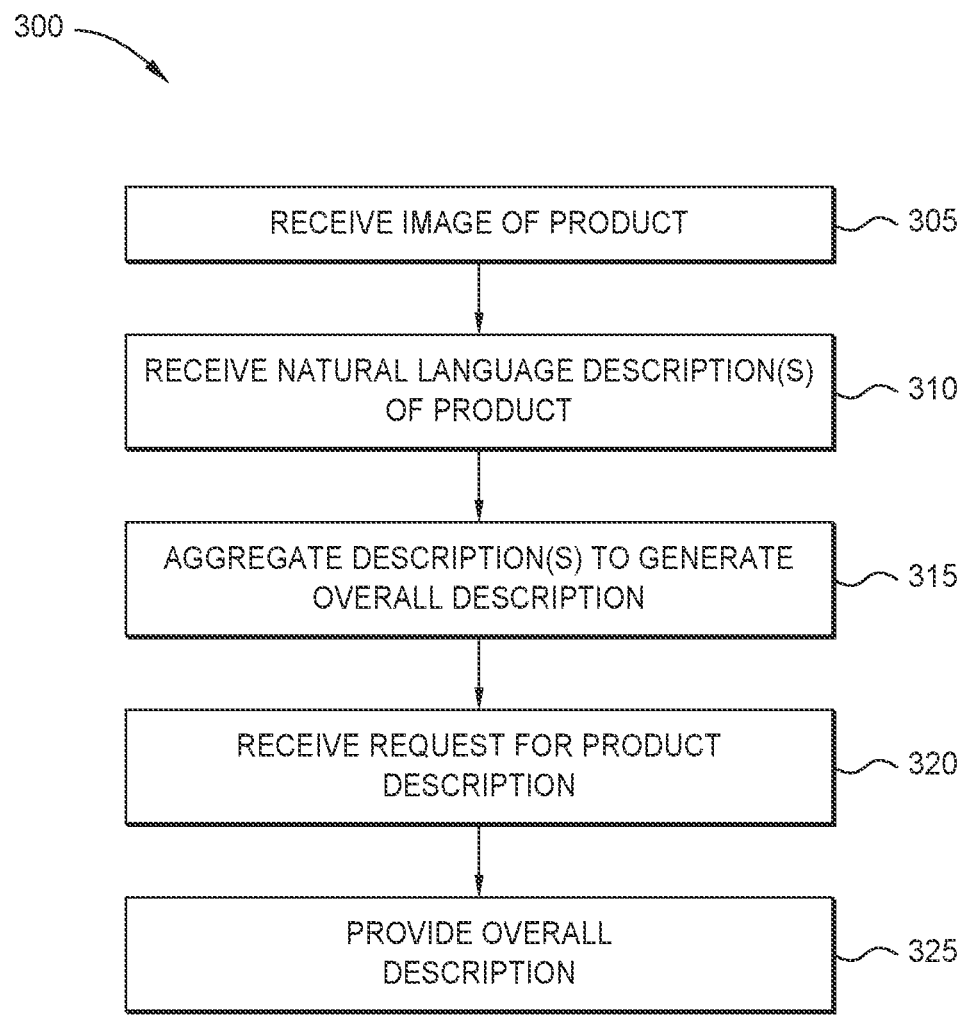
FIG. 3 is a flow diagram illustrating a method for generating natural language descriptions for images, according to one embodiment disclosed herein.

FIG. 3 is a flow diagram illustrating a method 300 for generating natural language descriptions for images, according to one embodiment disclosed herein. The method 300 begins at block 305, where a graphics translation server (e.g., the Graphics Translation Server 105 of FIG. 1) receives an image of a product. As discussed above, though product images in a retail setting are used in some examples herein, aspects of the present disclosure can be applied to a wide variety of imagery.

At block 310, the graphics translation server receives a set of natural language descriptions of the depicted product. In one embodiment, the graphics translation server retrieves user-provided reviews or descriptions (e.g., submitted by consumers). In some embodiments, the graphics translation server can retrieve the description provided by the retailer or manufacturer of the product. In at least one embodiment, the graphics translation server can transmit the image (or a pointer to the image) and a form to one or more users, where the form requests input on specific descriptors (e.g., color, length, material, and the like). Responses to this request can be used as the descriptions.

At block 315, the graphics translation server aggregates the received description(s) to generate an overall description for the image. In some aspects, as discussed above, the graphics translation server does so by identifying shared descriptors that satisfy some defined commonality criteria in the descriptions. For example, the graphics translation server may identify descriptors that are included in a minimum number or percentage of the descriptions. Similarly, the graphics translation server may identify, for each type of descriptor, which value is found most often (e.g., which color, which length, and the like). The graphics translation server can then generate the overall description to include these shared descriptors.

In some embodiments, as discussed above, the graphics translation server may also identify descriptors that are shared between the current image and one or more other images. For example, as discussed above, suppose a retailer described a products as "dusk" colored, and the graphics translation server determined that "purple" is a shared color descriptor in user reviews. In one embodiment, if the same retailer describes a different product color as "dusk," the graphics translation server may determine to include "purple" as a shared descriptor. In this way, the graphics translation server may identify some shared descriptors without evaluating additional descriptions for the new image.

In at least one embodiment, the graphics translation server can additionally or alternatively evaluate the image using one or more trained machine learning models, as discussed above, to generate the overall description.

In some embodiments, the graphics translation server can store the shared descriptors and/or overall description in association with the image for subsequent use. That is, the graphics translation server may evaluate the image and/or descriptions at one point in time, and store the resulting overall description for future use (e.g., when a user requests a description of the image). In another embodiment, the graphics translation server can perform the analysis and description generation upon request from a user. The graphics translation server can then store the description for subsequent requests (e.g., to reduce computational expense of future requests).

At block 320, the graphics translation server receives a request for a description of the product. For example, the request may be received from a user device (e.g., the User Device 135 of FIG. 1). In some embodiments, the request includes a request for information about the product in general. In some embodiments, the request includes a request for information about the image specifically. In at least one embodiment, the request specifies the image(s), and requests a detailed description.

For example, in one embodiment, a user may use an assistant device to verbally request information about a product. In response, the device may request, from the graphics translation server, a set of descriptors and/or overall description for an image of the product.

At block 325, the graphics translation server provides the overall description (generated in block 315). As discussed above, the graphics translation server may generate the overall description in response to receiving the request, or may pre-generate the overall description (storing it for subsequent requests). In some aspects, the overall description can then be used to generate audio output (e.g., using one or more text-to-speech techniques or algorithms), allowing the user to understand the content and context of the image (and, therefore, the product) without needing to actually view the image.

Figure 4:
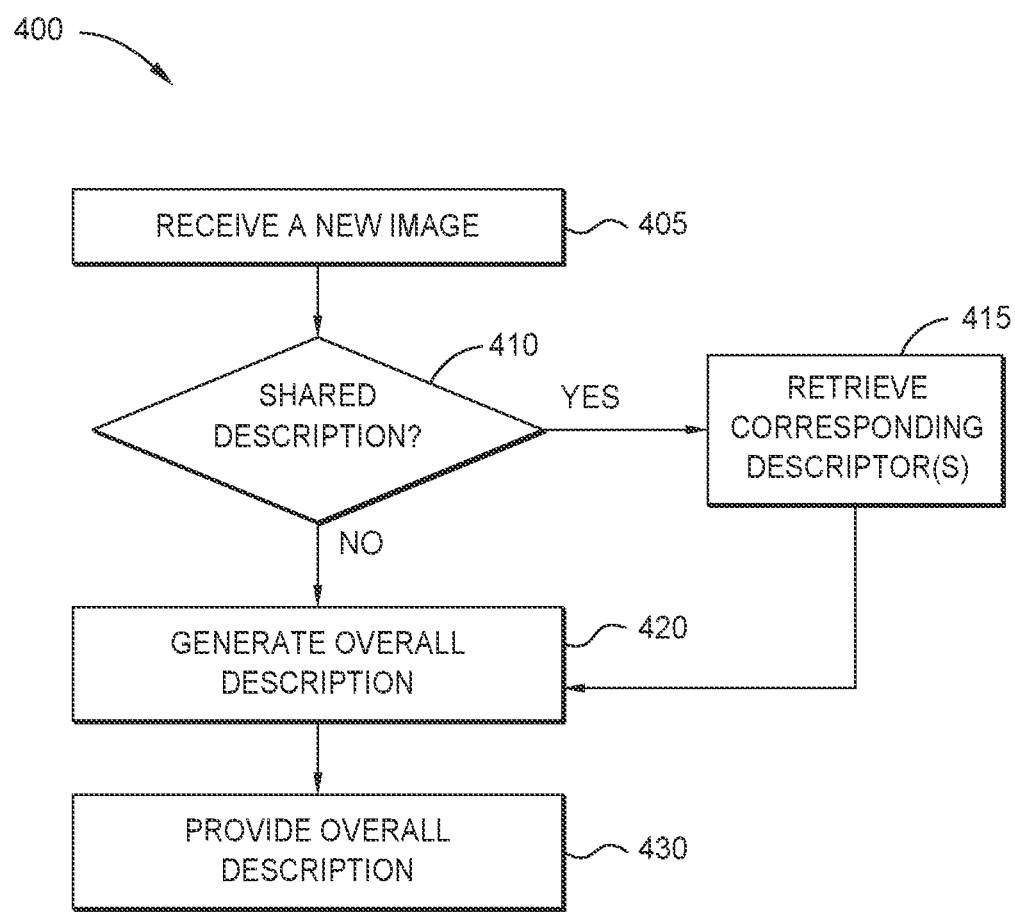
FIG. 4 is a flow diagram illustrating a method for automatically generating natural language descriptions based on related images, according to one embodiment disclosed herein.

FIG. 4 is a flow diagram illustrating a method 400 for automatically generating natural language descriptions based on related images, according to one embodiment disclosed herein. In some embodiments, the method 400 is used to generate overall descriptions for a given image based on previously-generated overall descriptions for other images associated with the same entity (e.g., the same retailer or manufacturer), rather than based solely on user-provided descriptions.

The method 400 begins at block 405, where a graphics translation server (e.g., the Graphics Translation Server 105 of FIG. 1) receives a new image that has not been evaluated (e.g., that does not have an accompanying overall description). As discussed above, in some embodiments, the new image may depict a product available for purchase via a retail establishment.

At block 410, the graphics translation server determines whether the new image is associated with a description that overlaps with other description(s) associated with other image(s). In at least one embodiment, this determination is limited to other image(s) associated with the same entity (e.g., the same retailer or manufacturer) and/or the same type (e.g., both depicting dresses).

In one embodiment, identifying shared or overlapping descriptions includes evaluating written descriptions provided by the retailer and/or manufacturer. For example, if the newly-received image includes a tag indicating that the depicted product is "slate" colored, the graphics translation server may determine whether there are other image(s) associated with the retailer and/or manufacturer that also include a "slate" tag. Of course, the shared description is not limited to color, and can generally include any overlapping terms used to describe both the newly-received image and the prior image(s).

In some embodiments, the graphics translation server can similarly identify overlapping or shared descriptions if the model in the new image (if present) is also depicted in a prior image. For example, the image may indicate (e.g., via a metadata tag) the identity of the model.

If no overlapping or shared descriptions are found, the method 400 continues to block 420, where the graphics translation server generates the overall description for the new image as discussed above (e.g., using the method 300 depicted in FIG. 3).

If, at block 410, the graphics translation server determines that there is at least one prior image with a shared or overlapping description, the method 400 continues to block 415. At block 415, the graphics translation server retrieves the corresponding descriptor(s) and/or overall description that were previously-generated for the prior image. Continuing the above example, the graphics translation server may determine that the prior image labeled "slate" is associated with a "light gray" descriptor (which may have been determined, for example, by scraping user reviews or comments).

The method 400 then continues to block 420, where the graphics translation server generates an overall description for the newly-received image based at least in part on the descriptor(s) associated with the prior image(s) (retrieved in block 415). In one embodiment, the graphics translation server may use all or a subset of the descriptors that are associated with the prior image when generating the overall description for the new image. For example, the graphics translation server may determine to use "light gray" as a color descriptor for the new image, based on determining that the prior image (which was also tagged as "slate") was described as "light gray" by users.

Advantageously, this can reduce computational expense (by reusing prior-generated descriptions) and improve uniformity within the retail environment (e.g., by ensuring that the product(s) are described using uniform shared descriptors).

At block 430, the graphics translation server can provide the generated overall description (e.g., in response to a request from a user).

Figure 5:
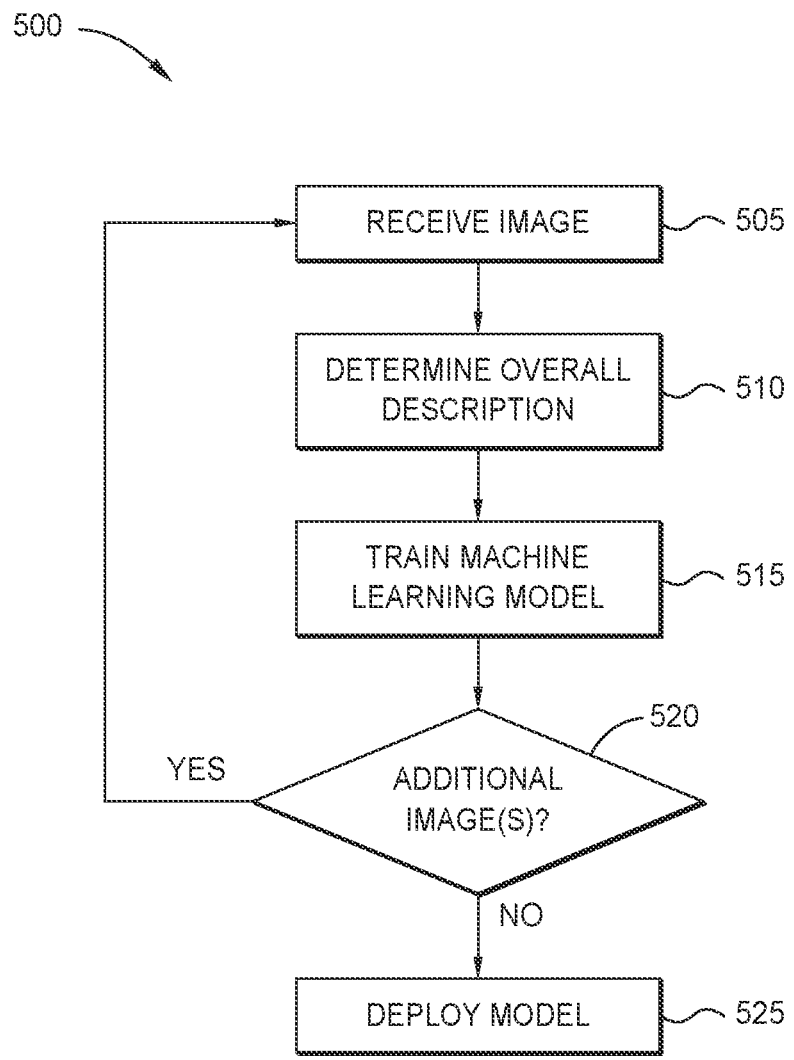
FIG. 5 is a flow diagram illustrating a method for training a machine learning model to generate natural language descriptions for images, according to one embodiment disclosed herein.

FIG. 5 is a flow diagram illustrating a method 500 for training a machine learning model to generate natural language descriptions for images, according to one embodiment disclosed herein.

The method 500 begins at block 505, where a graphics translation server (e.g., the Graphics Translation Server 105 of FIG. 1) receives an image. For example, as discussed above, the image may depict a product available for purchase via a retailer.

At block 510, the graphics translation server determines the overall description for the image. In one embodiment, if one has previously been generated, the graphics translation server can retrieve this generated overall description. If no overall description has yet been generated for the image, the graphics translation server may generate one (e.g., using the method 300 depicted in FIG. 3 and/or the method 400 depicted in FIG. 4).

At block 515, the graphics translation server trains one or more machine learning models based on the image and the overall description. For example, in one embodiment, the graphics translation server can use the image as input to the model, in order to generate a textual output. This output can then be compared against the actual overall description to compute a loss, which is used to update the parameters of the model. In this way, the model is iteratively refined to generate overall descriptions.

In at least one embodiment, in addition to or instead of training a model based on image input, the graphics translation server can train one or more models based on textual input. For example, the graphics translation server may use user-written descriptions as input, and the set of shared descriptors (or overall description) as target output. Subsequently, such a model may be used to generate overall descriptions (or shared descriptors) based on textual input.

At block 520, the graphics translation server determines whether there is at least one additional image that has not yet been used to train the model. If so, the method 500 returns to block 505. Otherwise, the method 505 continues to block 525.

At block 525, the graphics translation server deploys the trained model for use. For example, in one embodiment, when a new image is received (e.g., when a new product is added to the e-commerce website, when a new image of a product is uploaded, and/or when a user requests a description of an image), the graphics translation server can use the trained model to quickly and efficiently generate an overall description, as discussed above.

Figure 6:
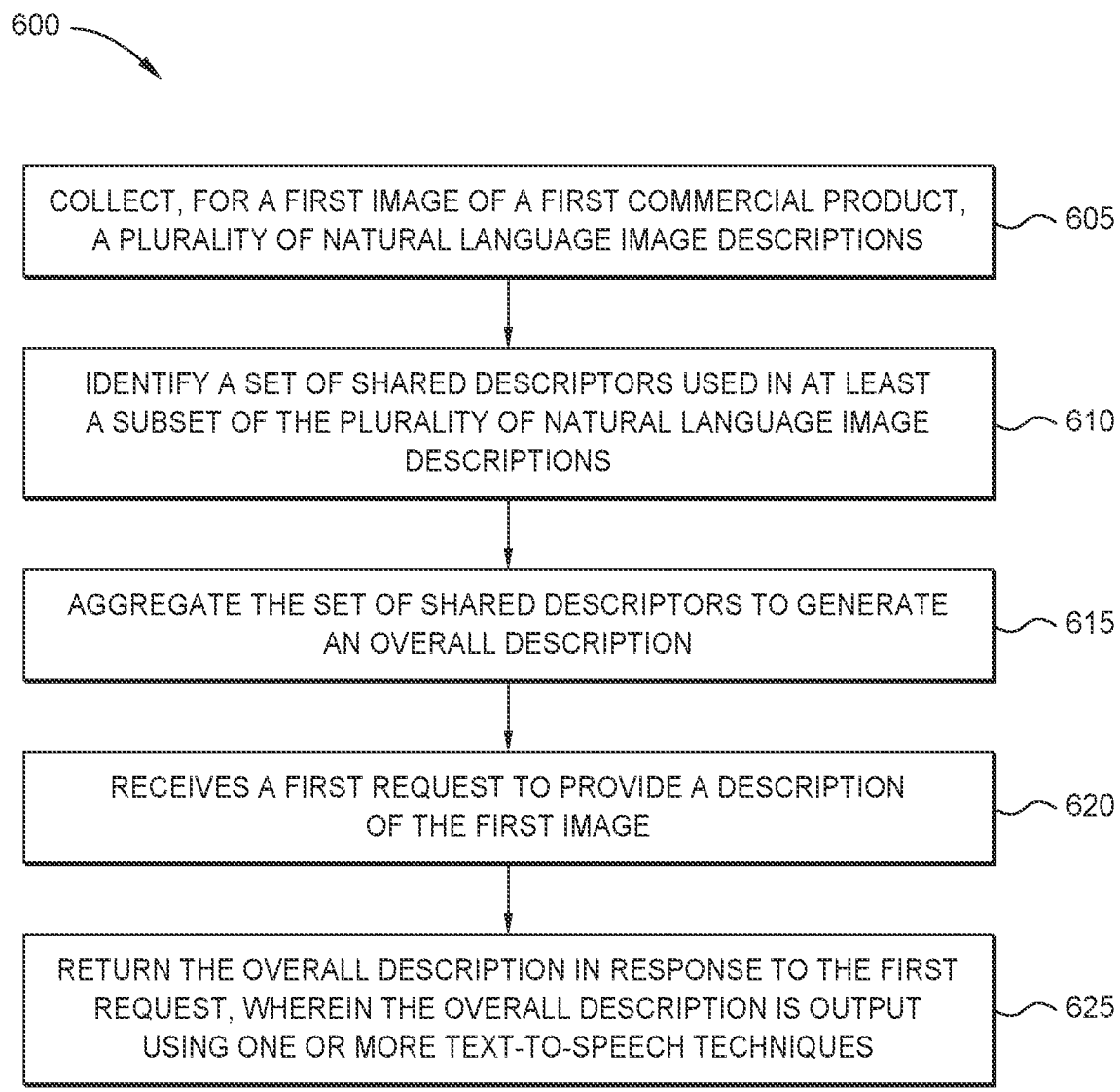
FIG. 6 is a flow diagram illustrating a method for generating descriptions for images, according to one embodiment disclosed herein.

FIG. 6 is a flow diagram illustrating a method 600 for generating descriptions for images, according to one embodiment disclosed herein.

The method 600 begins at block 605, where a graphics translation server (e.g., the Graphics Translation Server 105 of FIG. 1) collects, for a first image of a first commercial product, a plurality of natural language image descriptions.

In some embodiments, the plurality of natural language image descriptions correspond to user-provided reviews of the first product.

In some embodiments, collecting the plurality of natural language image descriptions comprises providing the first image to a plurality of users, and providing a form to the plurality of users, wherein the form requests user-input on specified descriptors for the first image.

At block 610, the graphics translation server identifies a set of shared descriptors used in at least a subset of the plurality of natural language image descriptions.

In some embodiments, the set of shared descriptors comprise: (i) a color of the first product; (ii) a texture of the first product; and (iii) a description of how the first product fits a human user.

At block 615, the graphics translation server aggregates the set of shared descriptors to generate an overall description. For example, the graphics translation server may aggregate the descriptors using the techniques described with reference to block 315 in FIG. 3.

At block 620, the graphics translation server receives a first request to provide a description of the first image.

At block 625, the graphics translation server returns the overall description in response to the first request, wherein the overall description is output using one or more text-to-speech techniques.

In some embodiments, the overall description is generated using one or more models that are specific to a retailer providing the first product. For example, as discussed above with reference to FIG. 1, the models may be specific to the relevant entity (such as the retailer).

In some embodiments, the method 600 also includes determining a first retailer-provided description of the first product, determining a second retailer-provided description of a second product depicted in a second image, and, upon determining that at least a portion of the first and second retailer-provided descriptions match, using at least a portion of the set of shared descriptors as an overall description for the second product.

In some embodiments, the method 600 also includes training the one or more models to generate overall descriptions for images, based at least in part on the first image and the set of shared descriptors. For example, the graphics translation server may use the method 500 depicted in FIG. 5 to train the models.

Figure 7:
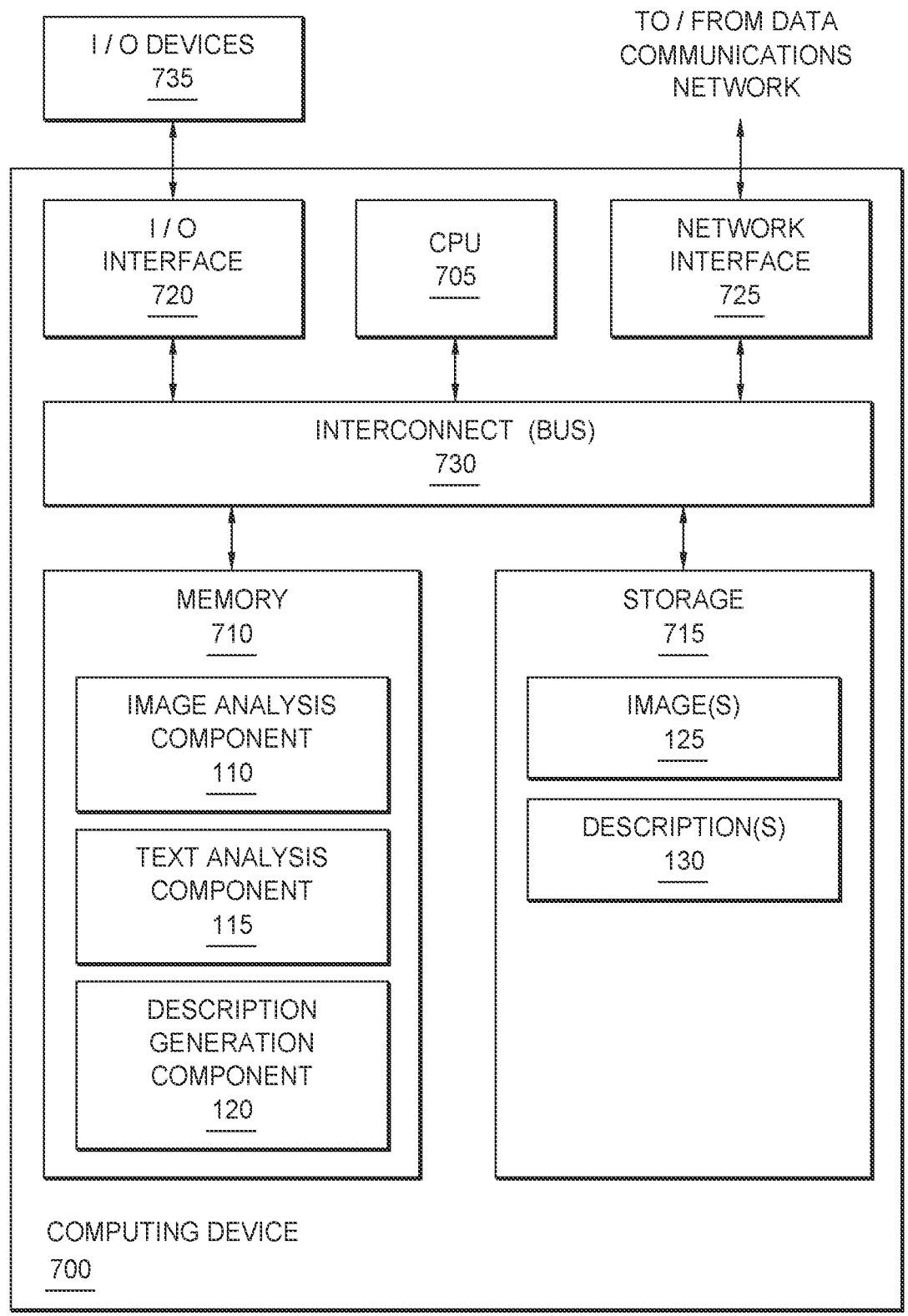
FIG. 7 is a block diagram depicting a computing device configured to provide natural language image descriptions, according to one embodiment disclosed herein.

FIG. 7 is a block diagram depicting a Computing Device 700 configured to provide natural language image descriptions, according to one embodiment disclosed herein. In one embodiment, the Computing Device 700 corresponds to the Graphics Translation Server 105 depicted in FIG. 1. Although depicted as a physical device, in embodiments, the Computing Device 700 may be implemented using virtual device(s), and/or across a number of devices (e.g., in a cloud environment). As illustrated, the Computing Device 700 includes a CPU 705, Memory 710, Storage 715, a Network Interface 725, and one or more I/O Interfaces 720. In the illustrated embodiment, the CPU 705 retrieves and executes programming instructions stored in Memory 710, as well as stores and retrieves application data residing in Storage 715. The CPU 705 is generally representative of a single CPU and/or GPU, multiple CPUs and/or GPUs, a single CPU and/or GPU having multiple processing cores, and the like. The Memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O Devices 735 (such as keyboards, monitors, etc.) are connected via the I/O Interface(s) 720. Further, via the Network Interface 725, the Computing Device 700 can be communicatively coupled with one or more other devices and components (e.g., via a network, which may include the Internet, local network(s), and the like). As illustrated, the CPU 705, Memory 710, Storage 715, Network Interface(s) 725, and I/O Interface(s) 720 are communicatively coupled by one or more Buses 730.

In the illustrated embodiment, the Storage 715 includes Images 125 and Descriptions 130. Although depicted as residing in Storage 715, in embodiments, the Images 125 and Descriptions 130 may reside in any suitable location. In some embodiments, the Storage 715 may also include identified shared descriptors and/or generated overall descriptions for each Image 125, as discussed above.

In the illustrated embodiment, the Memory 710 includes an Image Analysis Component 110, a Text Analysis Component 115, and a Description Generation Component 120, which may be configured to perform one or more embodiments discussed above.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the Image Analysis Component 110, Text Analysis Component 115, and/or Description Generation Component 120 could execute on a computing system in the cloud and analyze image and textual data in order to generate overall descriptions. In such a case, the components could generate overall descriptions and store them at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   collecting, for a first image of a first product, a plurality of natural language image descriptions;
   generating an overall description for the first image using one or more models, based on the plurality of natural language image descriptions, comprising:
     identifying a set of shared natural language descriptors used in at least a subset of the plurality of natural language image descriptions based on determining that each respective shared natural language descriptor of the set of shared natural language descriptors satisfies one or more commonality criteria, comprising at least one of: (i) determining that the respective shared natural language descriptor is present in at least a threshold number or threshold percentage of the plurality of natural language image descriptions, or (ii) determining that the respective shared natural language descriptor is a most common natural language descriptor in the plurality of natural language image descriptions; and
     aggregating the set of shared natural language descriptors to form the overall description;
   receiving a first request to provide a description of the first image; and
   returning the overall description in response to the first request, wherein the overall description is output using one or more text-to-speech techniques;
   wherein a system associated with the method learns over time to generate the image descriptions.

2. The method of claim 1, wherein the one or more models are specific to a retailer providing the first product.

3. The method of claim 2, further comprising:
   determining a first retailer-provided description of the first product;
   determining a second retailer-provided description of a second product depicted in a second image; and
   upon determining that at least a portion of the first and second retailer-provided descriptions match, using at least a portion of the set of shared natural language descriptors as an overall description for the second product.

4. The method of claim 1, wherein the plurality of natural language image descriptions correspond to user-provided reviews of the first product.

5. The method of claim 1, wherein collecting the plurality of natural language image descriptions comprises:
providing the first image to a plurality of users; and
providing a form to the plurality of users, wherein the form requests user-input on specified descriptors for the first image.

6. The method of claim 1, wherein the set of shared natural language descriptors comprise:
(i) a color of the first product;
(ii) a texture of the first product; and
(iii) a description of how the first product fits a human user.

7. The method of claim 1, further comprising:
training the one or more models to generate overall descriptions for images, based at least in part on the first image and the set of shared natural language descriptors.

8. A computer-readable storage medium containing computer program code that, when executed by operation of one or more computer processors, performs an operation comprising:
collecting, for a first image of a first product, a plurality of natural language image descriptions;
generating an overall description for the first image using one or more models, based on the plurality of natural language image descriptions, comprising:
identifying a set of shared natural language descriptors used in at least a subset of the plurality of natural language image descriptions based on determining that each respective shared natural language descriptor of the set of shared natural language descriptors satisfies one or more commonality criteria, comprising at least one of: (i) determining that the respective shared natural language descriptor is present in at least a threshold number or threshold percentage of the plurality of natural language image descriptions, or (ii) determining that the respective shared natural language descriptor is a most common natural language descriptor in the plurality of natural language image descriptions; and
aggregating the set of shared natural language descriptors to form the overall description;
receiving a first request to provide a description of the first image; and
returning the overall description in response to the first request, wherein the overall description is output using one or more text-to-speech techniques;
wherein a system associated with the computer readable medium learns over time to generate the image descriptions.

9. The computer-readable storage medium of claim 8, wherein the one or more models are specific to a retailer providing the first product.

10. The computer-readable storage medium of claim 9, the operation further comprising:
determining a first retailer-provided description of the first product;
determining a second retailer-provided description of a second product depicted in a second image; and
upon determining that at least a portion of the first and second retailer-provided descriptions match, using at least a portion of the set of shared natural language descriptors as an overall description for the second product.

11. The computer-readable storage medium of claim 8, wherein the plurality of natural language image descriptions correspond to user-provided reviews of the first product.

12. The computer-readable storage medium of claim 8, wherein collecting the plurality of natural language image descriptions comprises:
providing the first image to a plurality of users; and
providing a form to the plurality of users, wherein the form requests user-input on specified descriptors for the first image.

13. The computer-readable storage medium of claim 8, wherein the set of shared natural language descriptors comprise:
(i) a color of the first product;
(ii) a texture of the first product; and
(iii) a description of how the first product fits a human user.

14. The computer-readable storage medium of claim 8, the operation further comprising:
training the one or more models to generate overall descriptions for images, based at least in part on the first image and the set of shared natural language descriptors.

15. A system comprising:
one or more computer processors; and
a memory containing a program which when executed by the one or more computer processors performs an operation, the operation comprising:
collecting, for a first image of a first product, a plurality of natural language image descriptions;
generating an overall description for the first image using one or more models, based on the plurality of natural language image descriptions, comprising:
identifying a set of shared natural language descriptors used in at least a subset of the plurality of natural language image descriptions based on determining that each respective shared natural language descriptor of the set of shared natural language descriptors satisfies one or more commonality criteria, comprising at least one of: (i) determining that the respective shared natural language descriptor is present in at least a threshold number or threshold percentage of the plurality of natural language image descriptions, or (ii) determining that the respective shared natural language descriptor is a most common natural language descriptor in the plurality of natural language image descriptions; and
aggregating the set of shared natural language descriptors to form the overall description; receiving a first request to provide a description of the first image; and
returning the overall description in response to the first request, wherein the overall description is output using one or more text-to-speech techniques;
wherein the system learns over time to generate the image descriptions.

16. The system of claim 15, wherein the plurality of natural language image descriptions correspond to user-provided reviews of the first product.

17. The system of claim 15, wherein collecting the plurality of natural language image descriptions comprises:
providing the first image to a plurality of users; and
providing a form to the plurality of users, wherein the form requests user-input on specified descriptors for the first image.

18. The system of claim 15, wherein the set of shared natural language descriptors comprise:
   (i) a color of the first product;
   (ii) a texture of the first product; and
   (iii) a description of how the first product fits a human user.

19. The system of claim 15, the operation further comprising:
   determining a first retailer-provided description of the first product;
   determining a second retailer-provided description of a second product depicted in a second image; and
   upon determining that at least a portion of the first and second retailer-provided descriptions match, using at least a portion of the set of shared natural language descriptors as an overall description for the second product.

20. The system of claim 15, the operation further comprising:
   training the one or more models to generate overall descriptions for images, based at least in part on the first image and the set of shared natural language descriptors.

* * * * *